US012735540B2

(12) United States Patent
Son et al.

(10) Patent No.: US 12,735,540 B2
(45) Date of Patent: Sep. 15, 2026

(54) TRANSPARENT STRETCHABLE STRUCTURE HAVING UNIDIRECTIONALLY ORIENTED NANOSTRUCTURES AND METHOD OF MANUFACTURING THE SAME

(71) Applicants: KOREA INSTITUTE OF SCIENCE AND TECHNOLOGY, Seoul (KR); CHUNG ANG UNIVERSITY INDUSTRY ACADEMIC COOPERATION FOUNDATION, Seoul (KR)

(72) Inventors: Jeong Gon Son, Seoul (KR); Seungjun Chung, Seoul (KR); Heesuk Kim, Seoul (KR); Phillip Lee, Seoul (KR); Tae Ann Kim, Seoul (KR); Jae Hong Kim, Seoul (KR); Jung Hur, Seoul (KR); Jonghwi Lee, Seoul (KR)

(73) Assignees: KOREA INSTITUTE OF SCIENCE AND TECHNOLOGY, Seoul (KR); CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 718 days.

(21) Appl. No.: 18/183,836

(22) Filed: Mar. 14, 2023

(65) Prior Publication Data

US 2024/0174823 A1 May 30, 2024

(30) Foreign Application Priority Data

Nov. 30, 2022 (KR) ........................ 10-2022-0165085

(51) Int. Cl.
*C08J 5/18* (2006.01)
*C08J 3/24* (2006.01)
*G09F 9/30* (2006.01)

(52) U.S. Cl.
CPC ................ *C08J 5/18* (2013.01); *C08J 3/247* (2013.01); *G09F 9/301* (2013.01); *C08J 2300/22* (2013.01); *C08J 2300/26* (2013.01)

(58) Field of Classification Search
CPC . C08J 5/18; C08J 3/247; C08J 2300/22; C08J 2300/26
USPC ........................................................ 523/307
See application file for complete search history.

(56) References Cited

U.S. PATENT DOCUMENTS

2007/0106006 A1* 5/2007 Cooper .................... C08K 9/04 524/445
2008/0081174 A1* 4/2008 Lee .................. G02F 1/133606 427/245
2010/0233458 A1* 9/2010 Sun .......................... D01F 8/14 428/401
2020/0224018 A1* 7/2020 Usui ....................... B32B 27/36

FOREIGN PATENT DOCUMENTS

| JP | 6901408 B2 | 7/2021 |
|---|---|---|
| KR | 10-1749861 B1 | 6/2017 |
| KR | 10-2299529 B1 | 9/2021 |
| KR | 10-2374445 B1 | 3/2022 |

OTHER PUBLICATIONS

English Translation of KR 10-2299529 (Year: 2021).*
English Translation of CN 103111466 (Year: 2013).*
An Office Action mailed by the Korean Intellectual Property Office on Sep. 30, 2024, which corresponds to Korean Patent Application No. 10-2022-0165085 and is related to U.S. Appl. No. 18/183,836.
An Office Action mailed by the Korean Intellectual Property Office on Mar. 20, 2026, which corresponds to Korean Patent Application No. 10-2022-0165085 and is related to U.S. Appl. No. 18/183,836.

* cited by examiner

*Primary Examiner* — Hannah J Pak
(74) *Attorney, Agent, or Firm* — Studebaker Brackett PLLC

(57) ABSTRACT

Disclosed is a method of manufacturing a transparent stretchable structure according to various embodiments of the present invention for achieving the above-described objects. The method includes providing a stretchable film and performing a rolling process on the stretchable film to form a transparent stretchable structure, wherein the stretchable film is provided through a thermoplastic elastomer based on physical crosslinking, and nanostructures in the transparent stretchable structure are oriented in one direction through the rolling process.

8 Claims, 10 Drawing Sheets

FIG. 5

| Water Vapor Transmission Rate gm/m$^2$-day | |
|---|---|
| **Sample I.D :** SIBS-1 | **Sample I.D :** SIBS-2 |
| 1.22 | 1.20 |

TRANSPARENT STRETCHABLE STRUCTURE HAVING UNIDIRECTIONALLY ORIENTED NANOSTRUCTURES AND METHOD OF MANUFACTURING THE SAME

CROSS-REFERENCE TO RELATED APPLICATION

This application claims priority to and the benefit of Korean Patent Application No. 10-2022-0165085, filed on Nov. 30, 2022, the disclosure of which is incorporated herein by reference in its entirety.

BACKGROUND

1. Field of the Invention

The present invention relates to a substrate having flexibility, and more specifically, to a stretchable substrate which allows, by forming an elastic substrate having nanostructures oriented in one direction, normal strain to be controlled when the corresponding substrate is stretched, and a method of manufacturing the same.

2. Discussion of Related Art

Recently, research and development on stretchable electronic elements in which electrodes are formed on a flexible substrate, rather than conductive elements in which electrodes are formed on a rigid substrate, has been actively conducted. A stretchable electronic element is an electronic element manufactured on a substrate that can be freely stretched in response to external stress, and is a next-generation electronic element whose electrical/physical characteristics are maintained even when the element is mechanically deformed or an external force is applied thereto. Such a stretchable electronic element may be applied to a flexible device, a wearable device, and the like, and furthermore, may be used as a sensor, an electrode, or the like attached to a display or inside the human body.

Examples of the fields in which stretchable electronic elements can be most widely used include stretchable displays, stretchable solar cells, stretchable energy storage/generation elements, and the like, and the stretchable electronic elements show potential as a next-generation technology following flexible displays. Further, the stretchable electronic elements not only increase the degree of freedom of design due to their excellent mechanical variability, but also secure mechanical stability against an external force, and thus the market for stretchable electronic elements is expanding to wearable devices, electronic skin, smartphones, medical devices, healthcare monitoring systems, national defense, aerospace industries, and the like.

For a specific example, in relation to the display field, the stretchable electronic elements are developing in a direction of increasing the degree of freedom of deformation from fixed flat/curved displays to flexible, foldable, and rollable displays that can be folded or rolled in a single direction. Recently, as electronic devices have become smart and space mobility is emphasized, development of stretchable displays that can be deformed in a multidimensional axial direction under various conditions and freely used is required, rather than fixed displays.

As described above, with the development of technology related to the stretchable display field, it is expected that a new digital interface that goes beyond conventional methods will be implemented. However, since stretchable displays do not have a fixed axis or direction of deformation unlike conventional flexible, foldable, and rollable displays, distortion occurring during deformation is emerging as an issue.

Accordingly, it may be necessary to develop technologies for substrates that can be freely deformed without distortion of a display even under low stress, and for low-resistance, highly flexible, and highly stable stretchable electrodes. That is, there may be a demand for stretchable substrates having stable mechanical strain, reduced distortion, and high transmittance in the art.

RELATED ART DOCUMENTS

Patent Document

Korean Patent Registration No. 10-1749861 (Published on Jun. 15, 2017)

SUMMARY OF THE INVENTION

The present invention is directed to solving the above-described problems, which provides a transparent stretchable structure which allows, by forming an elastic substrate having nanostructures oriented in one direction, normal strain to be controlled when the corresponding substrate is stretched, and a method of manufacturing the same.

Objects of the present invention are not limited to the above-described objects and other objects which have not been described may be clearly understood by those skilled in the art from the above descriptions.

According to an aspect of the present invention, there is provided a method of manufacturing of a transparent stretchable structure. The method includes providing a stretchable film and performing a rolling process on the stretchable film to form a transparent stretchable structure, wherein the stretchable film is provided through a thermoplastic elastomer based on physical crosslinking, and nanostructures in the transparent stretchable structure are oriented in one direction through the rolling process.

The stretchable film may have a thickness of 10 μm to 5 mm.

The rolling process may be an asymmetric rolling process, in which a speed of an upper roll and a speed of a lower roll are different, and may be performed together with heat treatment.

A temperature of the heat treatment may range from 150 to 280° ° C.

The providing of the stretchable film may include introducing a curing agent into the stretchable film, and the rolling process may be performed together with curing treatment.

The stretchable film may include at least one of a block copolymer related to styrene-isobutylene-styrene (SIBS), styrene-butadiene-styrene (SBS), styrene-isoprene-styrene (SIS), styrene-ethylene-butylene-styrene (SEBS), styrene-ethylene-propylene-styrene (SEPS), or styrene-ethylene-ethylene-propylene-styrene (SEEPS), theromoplastic polyurethane (TPU), and a liquid crystal elastomer (LCE).

The stretchable film may include nanostructures in the form of cylinders, lamellas, or crystals, and the nanostructures may have a size of 5 nm to 100 nm.

The transparent stretchable structure may have an anisotropy in which a modulus in a first direction related to an orientation direction of the nanostructures is at least 20 times greater than a modulus in a second direction perpendicular to the first direction, and a Poisson's ratio of the transparent stretchable structure may be 0.1 or less.

According to another aspect of the present invention, there is provided a transparent stretchable structure. The transparent stretchable structure includes nanostructures which are oriented in one direction as a rolling process is performed on a stretchable film provided through a thermoplastic elastomer based on a block copolymer.

The stretchable film may have a thickness of 10 μm to 5 mm.

The rolling process may be an asymmetric rolling process, in which a speed of an upper roll and a speed of a lower roll are different, and may be performed together with heat treatment.

A temperature of the heat treatment may range from 150 to 280° ° C.

The providing of the stretchable film may include introducing a curing agent into the stretchable film, and the rolling process may be performed together with curing treatment.

The stretchable film may include at least one of a block copolymer related to styrene-isobutylene-styrene (SIBS), styrene-butadiene-styrene (SBS), styrene-isoprene-styrene (SIS), styrene-ethylene-butylene-styrene (SEBS), styrene-ethylene-propylene-styrene (SEPS), or styrene-ethylene-ethylene-propylene-styrene (SEEPS), theromoplastic polyurethane (TPU), and a liquid crystal elastomer (LCE).

The stretchable film may include nanostructures in the form of cylinders, lamellas, or crystals, and the nanostructures may have a size of 5 nm to 100 nm.

The transparent stretchable structure may have an anisotropy in which a modulus in a first direction related to an orientation direction of the nanostructures is at least 20 times greater than a modulus in a second direction perpendicular to the first direction, and a Poisson's ratio of the transparent stretchable structure may be 0.1 or less.

According to still another aspect of the present invention, there is provided a flexible electronic device. The flexible electronic device includes a transparent stretchable structure and a flexible electrode formed on the transparent stretchable structure, wherein the transparent stretchable structure includes nanostructures which are oriented in one direction through a rolling process performed on a stretchable film provided through a thermoplastic elastomer based on physical crosslinking.

Other specific details of the present invention are included in the detailed description and the accompanying drawings.

BRIEF DESCRIPTION OF THE DRAWINGS

Various aspects are now described with reference to the accompanying drawings, wherein like reference numerals are used to collectively refer to like components. In the following embodiments, for purposes of description, multiple specific details are set forth in order to provide overall understanding of one or more aspects. However, it will be apparent that such an aspect(s) may be embodied without these specific details.

The above and other objects, features and advantages of the present invention will become more apparent to those of ordinary skill in the art by describing exemplary embodiments thereof in detail with reference to the accompanying drawings, in which:

FIG. 5 is an exemplary flowchart illustrating a method of manufacturing a transparent stretchable structure related to an embodiment of the present invention;

DETAILED DESCRIPTION OF EXEMPLARY EMBODIMENTS

Figure 1:
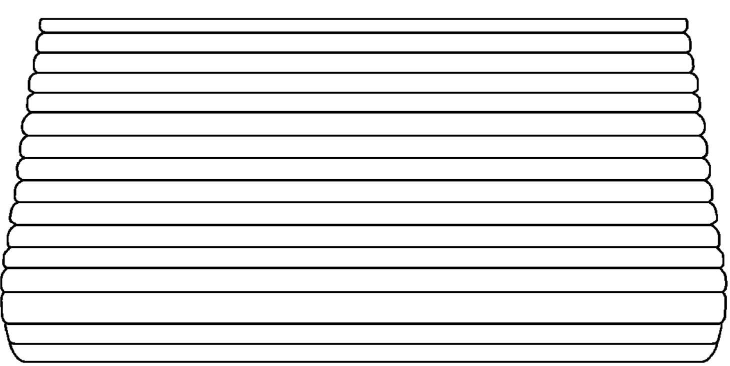
FIG. 1 is a schematic diagram illustrating a transparent stretchable structure related to an embodiment of the present invention.

Various embodiments and/or aspects are now disclosed with reference to the accompanying drawings. In the following description, for purposes of description, multiple specific details are set forth in order to facilitate overall understanding of one or more aspects. However, it will also be appreciated by those skilled in the art that such an aspect(s) may be practiced without these specific details. In the following description and accompanying drawings, specific exemplary aspects of one or more aspects are described in detail. However, these aspects are exemplary and some of the various methods in the principles of the various aspects may be used, and the described descriptions are intended to include all such aspects and their equivalents. Specifically, the terms “embodiment,” “example,” “aspect,” “exemplary,” etc., as used herein, should not be construed as indicating that any aspect or design described is preferred to or advantageous over other aspects or designs.

Hereinafter, the same or corresponding components are denoted by the same reference numerals regardless of reference numbers, and thus the description thereof will not be repeated. Further, in descriptions of the present invention, when detailed descriptions of related known configurations or functions are deemed to unnecessarily obscure the gist of the present invention, they will be omitted. Further, the accompanying drawings are only examples to facilitate the overall understanding of the exemplary embodiments of the present invention and the technological scope disclosed in this specification is not limited to the accompanying drawings.

It should be understood that, although the terms “first,” “second,” etc. may be used herein to describe various elements, components, and/or sections, these elements, components, and/or sections are not limited by these terms. The terms are only used to distinguish one element, component, or section from another element, component, or section. Therefore, it should be understood that a first element, a first component, or a first section to be described below may be a second element, a second component, or a second section within the technical scope of the present invention.

Unless otherwise defined, all terms (including technical and scientific terms) used herein can be used as is customary in the art to which this invention belongs. Also, it will be further understood that terms, such as those defined in commonly used dictionaries, will not be interpreted in an idealized or overly formal sense unless expressly so defined herein.

In addition, the term “or” is intended to mean an inclusive “or” rather than an exclusive “or.” That is, unless otherwise specified or clear from the context, “X employs A or B” is intended to mean one of the natural inclusive substitutions. That is, when the expression “X uses A,” “X uses B,” or “X uses both A and B” is used, the expression “X uses A or B” may be applied to any one of the above expressions. Further, the term “and/or” as used herein should be understood to refer to and include all possible combinations of one or more of listed related items.

Further, it should be understood that the terms “comprises,” “includes,” “comprising,” and/or “including” mean that the corresponding feature and/or component is present, but do not preclude the presence or addition of one or more other features, components, and/or groups thereof. Further, unless otherwise specified or where the context clearly indicates that a singular form is indicated, the singular in this specification and claims should generally be construed to mean “one or more.”

It should be understood that when an element is referred to as being “connected” or “coupled” to another element, the element may be directly connected or coupled to another element or intervening elements may be present. In contrast, when an element is referred to as being “directly connected” or “directly coupled” to another element, there are no intervening elements present.

The suffix “module,” “unit,” “part,” or “portion” of an element used herein is assigned or incorporated for the ease of writing the specification, and the suffix itself does not have a distinct meaning or role.

When an element or layer is referred to as being formed “on” or “under” another element or layer, the description includes the cases where the first element or layer is directly on the second element or layer and the cases where the two elements are formed with a third element or layer interposed therebetween. On the other hand, when an element is referred to as being formed “directly on” another element, it indicates that no other element or layer is intervening.

Spatially-relative terms such as “below,” “beneath,” “lower,” “above,” and “upper” may be used herein for ease of description to describe the relationship of one element or components with another element(s) or component(s) as illustrated in the drawings. Spatially relative terms should be understood to include different directions of the element during use or operation in addition to the direction illustrated in the drawing.

For example, if the element in the drawings is turned over, elements described as “below” or “beneath” other elements would then be oriented “above” the other elements. Therefore, an exemplary term “below” may encompass both an orientation of above and below. Elements may also be oriented in other orientations, and thus spatially relative terms may be interpreted according to orientation.

Objects and effects of the present invention and technical configurations for achieving the same will be clearly understood with reference to the accompanying drawings and the following detailed embodiments. When the present invention is described, if it is determined that detailed descriptions of known technology related to the present invention unnecessarily obscure the subject matter of the present invention, detailed descriptions thereof will be omitted. Some terms described below are defined by considering functions in the present invention, and meanings may vary depending on, for example, a user or operator’s intentions or customs.

However, the present invention is not limited to the embodiments to be disclosed below but may be implemented in various different forms. The embodiments are provided in order to fully explain the present embodiments and fully explain the scope of the present invention for those skilled in the art. The scope of the present invention is only defined by the appended claims. Therefore, the meanings of terms should be interpreted based on the scope throughout this specification.

Figure 2A:
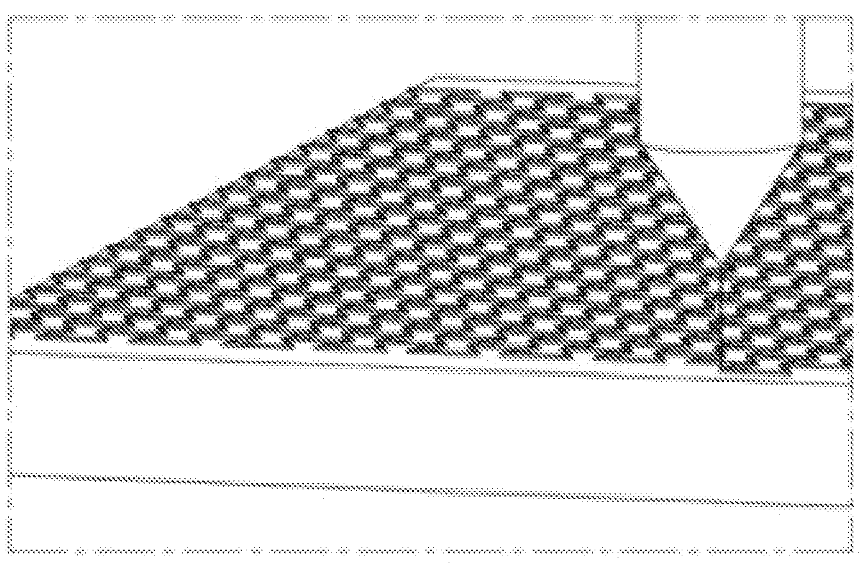
FIG. 2A is a set of exemplary diagrams of an auxetic structure provided with any of various shapes related to an embodiment of the present invention and having a Poisson's ratio close to zero.
Figure 2B:
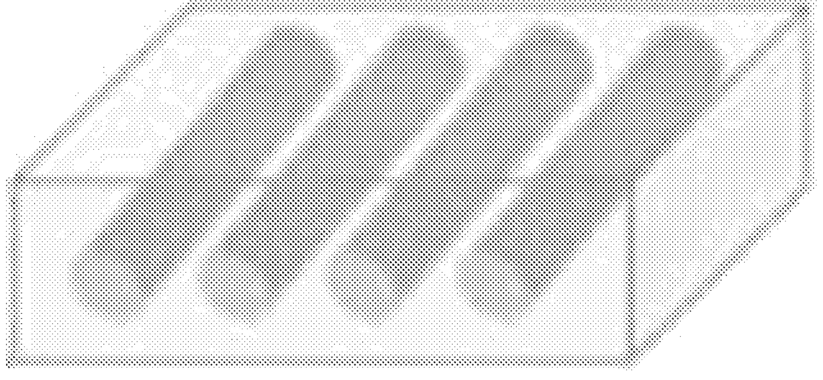
FIG. 2B is a set of exemplary diagrams of an structure provided with any of various shapes related to an embodiment of the present invention and having a Poisson's ratio close to zero.
Figure 3A:
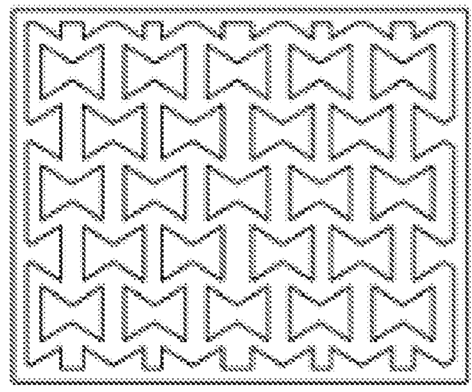
FIG. 3A is a set of exemplary diagrams showing conventional techniques for controlling normal strain during stretching.
Figure 3B:
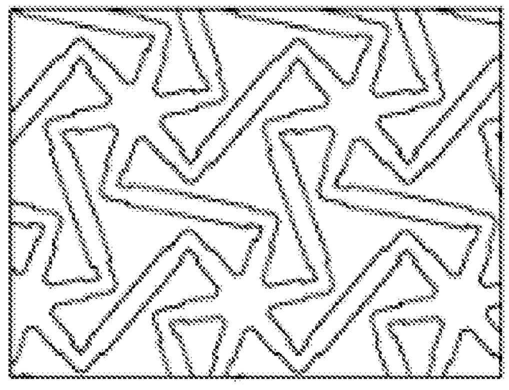
FIG. 3B is a set of exemplary diagrams showing conventional techniques for controlling normal strain during stretching.
Figure 3C:
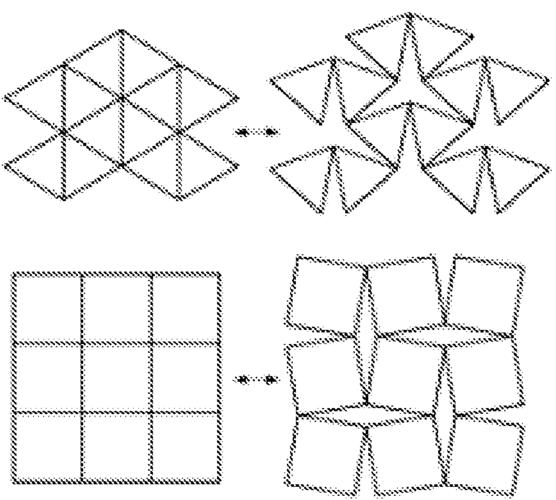
FIG. 3C is a set of exemplary diagrams showing conventional techniques for controlling normal strain during stretching.
Figure 4:
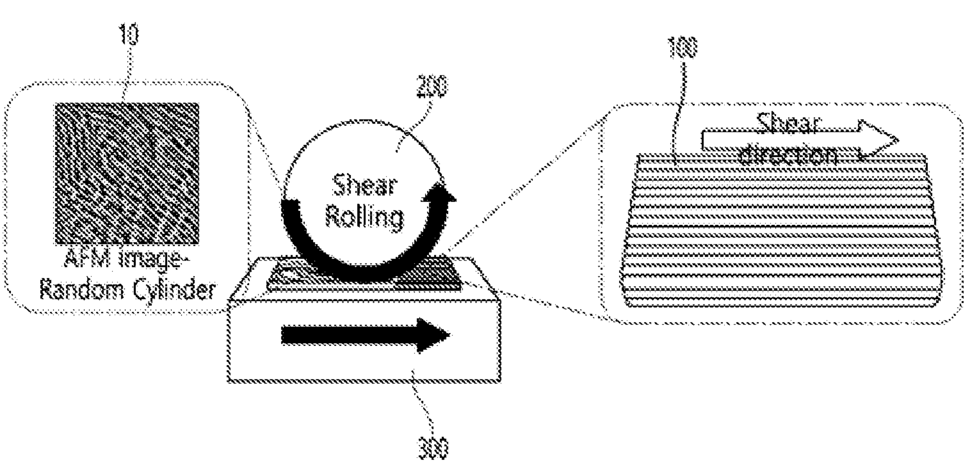
FIG. 4 is an exemplary diagram illustrating a process of forming a transparent stretchable structure related to an embodiment of the present invention.
Figure 5:
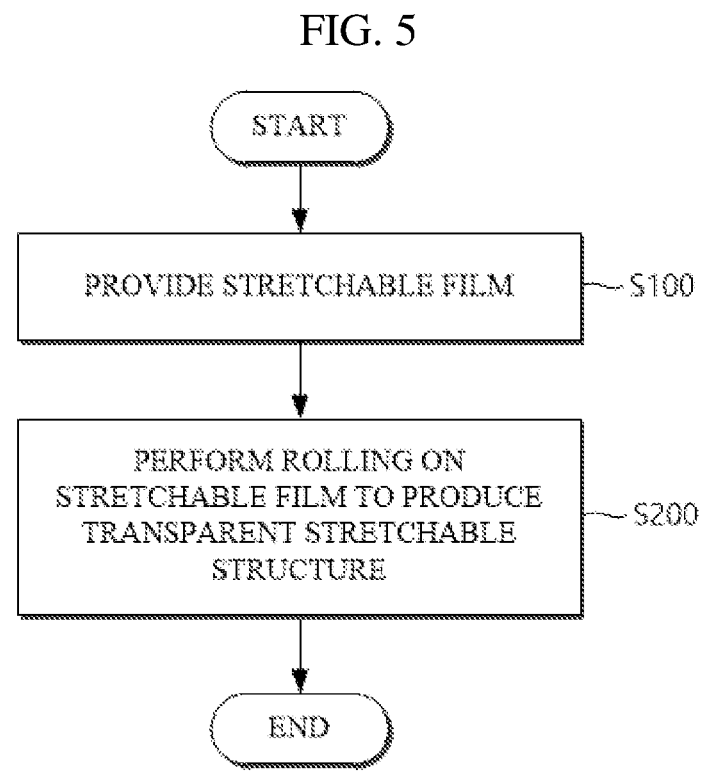
Figure 6A:
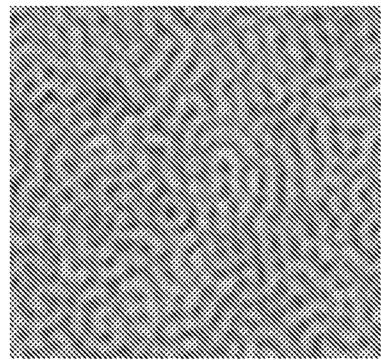
FIG. 6A is a set of exemplary diagrams showing pattern aspects of nanostructures according to a difference in speed between an upper roll and a substrate during an asymmetric rolling process related to an embodiment of the present invention.
Figure 6B:
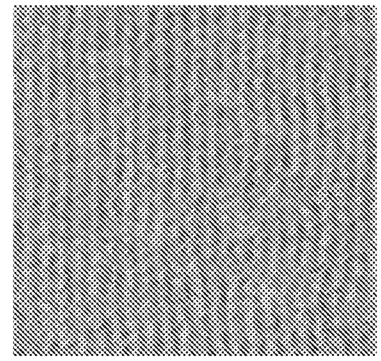
FIG. 6B is a set of exemplary diagrams showing pattern aspects of nanostructures according to a difference in speed between an upper roll and a substrate during an asymmetric rolling process related to an embodiment of the present invention.
Figure 6C:
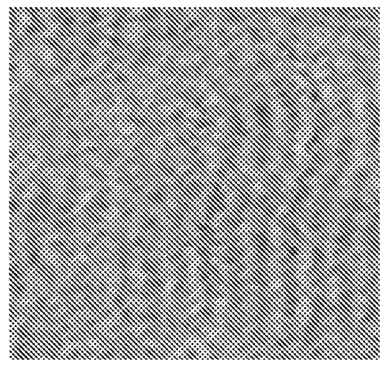
FIG. 6C is a set of exemplary diagrams showing pattern aspects of nanostructures according to a difference in speed between an upper roll and a substrate during an asymmetric rolling process related to an embodiment of the present invention.
Figure 7:
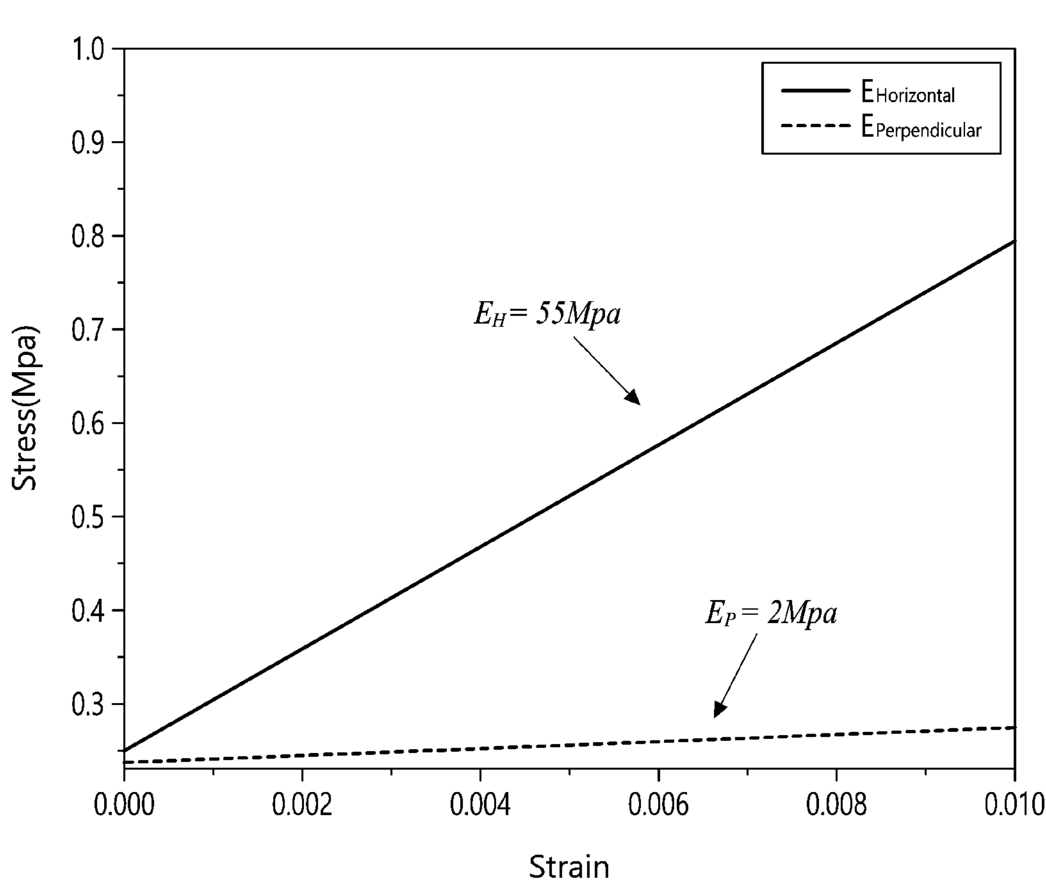
FIG. 7 is an exemplary diagram showing experimental values related to moduli in each of a first direction and a second direction related to an embodiment of the present invention.
Figure 8:
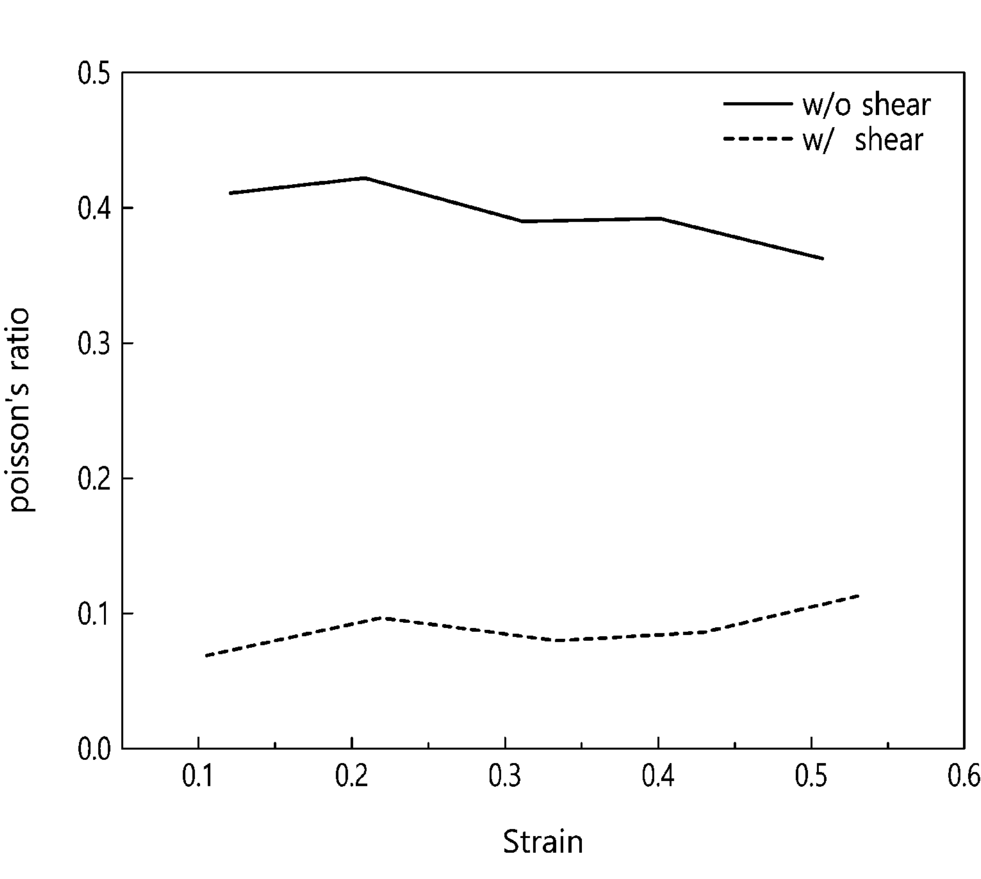
FIG. 8 is an exemplary diagram showing experimental values related to changes in Poisson's ratio according to stretching of a transparent stretchable structure related to an embodiment of the present invention.
Figure 9:
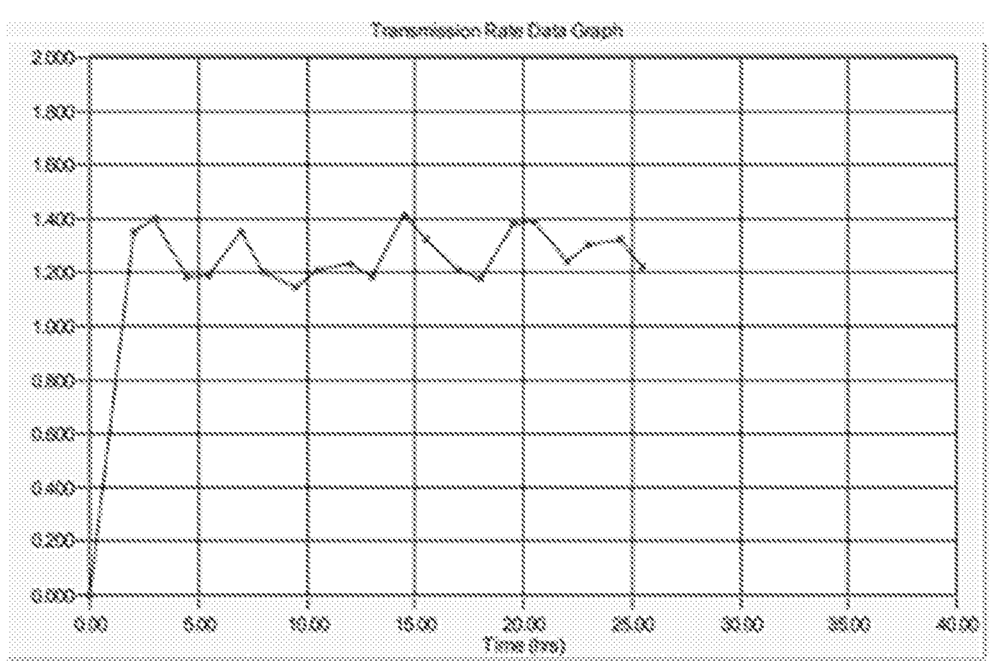
FIG. 9 is an exemplary diagram showing experimental values related to blocking properties of a transparent stretchable structure related to an embodiment of the present invention.
Figure 10A:
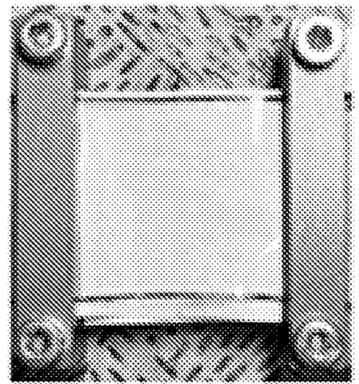
FIG. 10A is a set of exemplary diagrams for explaining that it is possible to control the normal strain of a transparent stretchable structure during stretching related to an embodiment of the present invention.
Figure 10B:
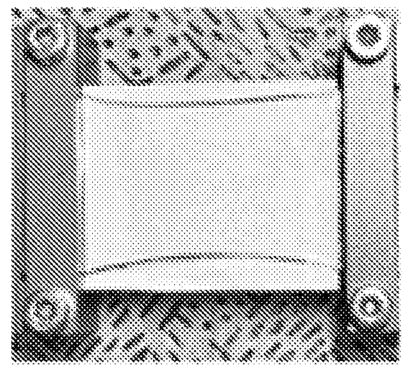
FIG. 10B is a set of exemplary diagrams for explaining that it is possible to control the normal strain of a transparent stretchable structure during stretching related to an embodiment of the present invention.
Figure 10C:
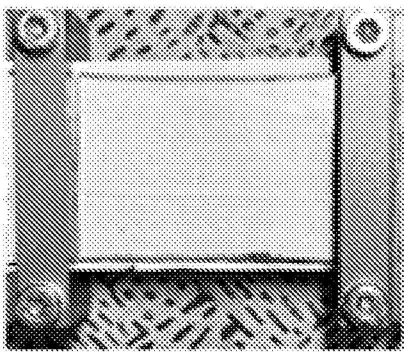
FIG. 10C is a set of exemplary diagrams for explaining that it is possible to control the normal strain of a transparent stretchable structure during stretching related to an embodiment of the present invention.

FIG. 1 is a schematic diagram illustrating a transparent stretchable structure related to an embodiment of the present invention. FIG. 2A is a set of exemplary diagrams of an auxetic structure provided with any of various shapes related to an embodiment of the present invention and having a Poisson’s ratio close to zero. FIG. 2B is a set of exemplary diagrams of an structure provided with any of various shapes related to an embodiment of the present invention and having a Poisson’s ratio close to zero. FIG. 3A is a set of exemplary diagrams showing conventional techniques for controlling normal strain during stretching. FIG. 3B is a set of exemplary diagrams showing conventional techniques for controlling normal strain during stretching. FIG. 3C is a set of exemplary diagrams showing conventional techniques for controlling normal strain during stretching. FIG. 4 is an exemplary diagram illustrating a process of forming a transparent stretchable structure related to an embodiment of the present invention. FIG. 5 is an exemplary flowchart illustrating a method of manufacturing a transparent stretchable structure related to an embodiment of the present invention. FIG. 6A is a set of exemplary diagrams showing pattern aspects of nanostructures according to a difference in speed between an upper roll and a substrate during an asymmetric rolling process related to an embodiment of the present invention. FIG. 6B is a set of exemplary diagrams showing pattern aspects of nanostructures according to a difference in speed between an upper roll and a substrate during an asymmetric rolling process related to an embodiment of the present invention. FIG. 6C is a set of exemplary diagrams showing pattern aspects of nanostructures according to a difference in speed between an upper roll and a substrate during an asymmetric rolling process related to an embodiment of the present invention. FIG. 7 is an exemplary diagram showing experimental values related to moduli in each of a first direction and a second direction related to an embodiment of the present invention. FIG. 8 is an exemplary diagram showing experimental values related to changes in Poisson's ratio according to stretching of a transparent stretchable structure related to an embodiment of the present invention. FIG. 9 is an exemplary diagram showing experimental values related to blocking properties of a transparent stretchable structure related to an embodiment of the present invention. FIG. 10A is a set of exemplary diagrams for explaining that it is possible to control the normal strain of a transparent stretchable structure during stretching related to an embodiment of the present invention. FIG. 10B is a set of exemplary diagrams for explaining that it is possible to control the normal strain of a transparent stretchable structure during stretching related to an embodiment of the present invention. FIG. 10C is a set of exemplary diagrams for explaining that it is possible to control the normal strain of a transparent stretchable structure during stretching related to an embodiment of the present invention.

FIG. 1 is a schematic diagram illustrating a transparent stretchable structure related to an embodiment of the present invention. As illustrated in FIG. 1, a transparent stretchable structure 100 may include nanostructures oriented in one direction. The transparent stretchable structure 100 may have a Poisson's ratio close to zero.

Specifically, since the transparent stretchable structure 100 is formed through an asymmetric rolling process at a high temperature, the transparent stretchable structure 100 may include nanostructures oriented horizontally in one direction. That is, the nanostructures included in the transparent stretchable structure 100 may be oriented horizontally in one direction through shear rolling. Through the nanostructures oriented in one direction, the mechanical anisotropy of a composite may be maximized and the composite may have a Poisson's ratio close to zero.

Here, the Poisson's ratio may be a ratio between strain in a lateral direction and strain in a longitudinal direction in which a material is stretched in a specific direction by a tensile force acting on the material. Most materials have a positive Poisson's ratio because the signs of strain in the tensile and lateral directions of the material are different when a tensile force is applied thereto in a uniaxial direction.

For a specific example, when stress is applied to a material having a general structure in a lateral direction, the material is stretched in the corresponding direction and at the same time, shrinks in a longitudinal direction. That is, the Poisson's ratio between the strain in the longitudinal direction and the strain in the lateral direction caused by normal stress generated inside the material may be a positive number. Although such a Poisson's ratio is originally a material-specific property, it may be possible to control strain in a direction perpendicular to a stretching direction when a material is formed to have a specific shape or specific arrangement characteristic.

In the transparent stretchable structure 100 of the present invention, when stress is applied in a lateral direction (direction perpendicular to the orientation direction of the nanostructures), a modulus in a longitudinal direction (orientation direction of the nanostructures) is very high compared to that in the lateral direction, and thus shrinkage in the longitudinal direction may hardly occur. That is, the transparent stretchable structure 100 of the present invention may be designed to have a Poisson's ratio close to zero, unlike general materials. According to the embodiment, the transparent stretchable structure 100 may not be deformed in the direction perpendicular to the stretching direction, which hardly occurs in normal stretching in nature.

In other words, since the transparent stretchable structure 100 of the present invention is provided to have nanostructures oriented in one direction through shear rolling, the Poisson's ratio may be close to zero, or the strain in the direction perpendicular to the stretching direction may be minimized.

Accordingly, the transparent stretchable structure 100 of the present invention may provide a high degree of freedom of design, such as being deformed in various axial directions and the like. For example, when a display is formed using the transparent stretchable structure 100 of the present invention, it is possible to support deformation in a multi-dimensional axial direction, such as folding or rolling in a single direction, under various conditions, rather than fixed displays. Accordingly, it is possible to provide higher variability and to secure mechanical stability due to an external force as well as to improve the degree of freedom of design.

Meanwhile, as a material (i.e., a material having a Poisson's ratio close to zero) having a structure that supports the deformation in the multi-dimensional axial direction under various conditions, for example, there are an auxetic structure and a structure in which reinforcing members are oriented in one direction.

As illustrated in FIG. 2A, an auxetic structure may be impregnated inside a structure (e.g., a substrate) to have a specific shape, and may cause deformation in a direction of another axis with respect to an external force occurring based on one axis. For example, as illustrated in FIG. 3, when an auxetic including unit structures having a reentrant shape, a chiral shape, or a rotating rigid body shape is impregnated inside the substrate, the corresponding substrate may have a Poisson's ratio close to zero.

For a more specific example, as illustrated in FIG. 3A, when an external force is applied to an auxetic including unit structures having a reentrant shape in a longitudinal direction, the corresponding auxetic may have a Poisson's ratio close to zero as internal stress acts in a lateral direction of each unit structure. That is, the auxetic may be stretched in a lateral direction based on an axis with respect to an external force occurring based on a longitudinal direction axis.

Further, for example, as illustrated in FIG. 3B, when an external force is applied to an auxetic including unit structures having a chiral shape in a longitudinal direction, the corresponding auxetic may have a Poisson's ratio close to zero as each unit structure rotates clockwise or counterclockwise.

Further, for example, as illustrated in FIG. 3C, an auxetic including unit structures having a rotating rigid body shape may share one node, each unit structure rotates through the corresponding node, and thus the corresponding auxetic may exhibits characteristics of a material having a Poisson's ratio close to zero. That is, when an external force is applied to the corresponding auxetic in a longitudinal direction, each unit structure rotates clockwise or counterclockwise as a connection line is released based on the node shared between the respective unit structures, and thus the corresponding auxetic may have a Poisson's ratio close to zero.

That is, as in the above-described examples, since the materials are implemented through unit structures of various shapes, there are materials with an auxetic structure having a Poisson's ratio close to zero. In the case of a substrate (i.e., a material with an auxetic structure) into which such an auxetic structure is impregnated, when an external force is applied to the corresponding auxetic in a specific axial direction through the shape of unit structures included in the corresponding auxetic, the strain in another axial direction may be controlled.

The materials with such an auxetic structure may be formed through a printing process using, for example, an elastic material. Here, the printing process is a process in which a target object is printed with a designed circuit pattern through an inkjet printer, a laminator, etc. and may be roll-to-roll processing in which a specific lattice structure is formed (or laminated) through stretchable or elastic materials. Such a printing process may be, for example, a process using equipment such as an inkjet printer, a pneumatic dispenser, a screw dispenser, a screen printer, a bar coater, a spray printer, or the like.

As described above, the materials with the auxetic structure may realize material properties having a Poisson's ratio close to zero through various unit structure shapes (e.g., reentrant shape, chiral shape, rotating rigid body shape, etc.).

However, the materials with the auxetic structure have a problem that transparency is lowered due to a difference in refractive index between the substrate and the structure. For a specific example, in the case of the auxetic structure, different strains may be applied at each position due to the structural deformation of the auxetic structure during stretching, and accordingly, there is a disadvantage in securing visibility, such as the shape of the auxetic being conspicuous on the inside.

Additionally, since an auxetic corresponding to various shapes of tens to hundreds of micro gaps and sizes should be formed of the materials with the auxetic structure to have a Poisson's ratio close to zero, equipment related to the high-precision printing process is essentially required, and various additional processes, such as a curing process for the formed auxetic and an additional curing process in the process of forming the stretchable substrate by impregnating the corresponding auxetic into the stretchable substrate may be required. In other words, for the materials with the auxetic structure, expensive high-precision equipment may be required in the manufacturing process, and much effort and long time may be required for designing various lattice structures, an additive manufacturing process, a curing process, and the like.

In order to solve the problem of the process for such an auxetic structure and the problem that it is difficult to secure visibility as different strains are caused by location during stretching, there is a stretchable structure that realizes a Poisson's ratio close to zero by impregnating reinforcing materials having a specific fiber shape into an elastic substrate, as illustrated in FIG. 2B.

In the stretchable structure as illustrated in FIG. 2B, when stress is applied in a direction perpendicular to a direction in which the reinforcing materials are oriented for stretching, a modulus in the orientation direction of the reinforcing materials is very high compared to that in the lateral direction so that shrinkage hardly occurs in the longitudinal direction, and accordingly, the stretchable structure may have a Poisson's ratio close to zero. That is, when the reinforcing materials re impregnated into the substrate to be oriented in a specific orientation direction and a force for stretching is applied in a specific axial direction, the strain of an axis located perpendicular to the corresponding axis may be controlled.

However, the above-described stretchable structure also has a problem that transparency is lowered due to a difference in refractive index between the substrate and the reinforcing materials. Further, when the corresponding stretchable structure is stretched, the corresponding stretchable structure has a Poisson's ratio close to zero, and thus shrinkage may be accelerated in a thickness direction (e.g., a z-axis direction) and the shape of the reinforcing materials inside the substrate may be exposed to the outside due to the shrinkage in the z-axis direction, which may increase surface roughness.

As described above, the conventional stretchable structures for realizing a Poisson's ratio close to zero have difficulty in securing transparency, surface roughness may be increased due to stretching, and much effort and long time may be required in the process.

Accordingly, the present invention is directed to providing a transparent stretchable structure having a Poisson's ratio close to zero while ensuring transparency.

The transparent stretchable structure 100 of the present invention may be formed through performing a rolling process on a stretchable film. Here, the stretchable film may be a thermoplastic elastomer based on physical crosslinking. For example, the stretchable film may include block copolymer theromoplastic polyurethane (TPU) or a liquid crystal elastomer that forms an elastic material through physical crosslinking.

In an embodiment, the stretchable film may be a film provided through a block copolymer-based thermoplastic elastomer. The block copolymer may be a polymer formed by linearly connecting two or more different polymer monomers. The block copolymer undergoes an annealing process at a high temperature or in a solvent atmosphere, causing chains to move and nano-scale phase separation to naturally form a specific nanostructure. The size and morphology of the nanostructures vary according to the type of block copolymer, a molecular weight, a molar ratio, and an annealing method.

Since the nanostructures formed in such a block copolymer are generally formed by naturally formed self-assembly characteristics, it is possible to form a random fingerprint, that is, a fingerprint-shaped pattern.

Since the stretchable film 10 of the present invention is provided using a material of the block copolymer, the stretchable film 10 may have a random fingerprint nanostructure pattern, as illustrated in FIG. 4.

In the present invention, by performing a rolling process on the stretchable film 10 having such a nanostructure pattern of the random fingerprint to apply shear and at the same time, perform annealing, it is possible to form the transparent stretchable structure 100 having nanostructures oriented horizontally in one direction rather than random fingerprint-shaped nanostructures.

In a specific embodiment, as illustrated in FIG. 4, the transparent stretchable structure 100 may be formed by performing a rolling process on the stretchable film 10 using a rolling machine. The rolling process may be a method of molding a material by passing the material between rollers rotating for hot or cold working. Since the stretchable film 10 passes between an upper roll and a stage of the rolling machine, a transparent stretchable structure 100 having nanostructures oriented in one direction may be formed. In the embodiment, since the nanostructures are oriented horizontally in one direction, the mechanical anisotropy of the transparent stretchable structure 100 may be maximized, and accordingly, the transparent stretchable structure 100 may have a Poisson's ratio close to zero. For a specific example, since a modulus in a first direction in which the nanostructures are oriented is significantly greater than a modulus in a second direction perpendicular to the first direction, anisotropy may be maximized, and thus a Poisson's ratio may be close to zero.

That is, according to the present invention, it is possible to induce nanocylinders to be oriented in one direction through asymmetric rolling of the stretchable film 10, and thus it is possible to impart mechanical anisotropy by making a difference between a direction in which the nanocylinders are oriented and a direction perpendicular to the orientation direction. A more specific description of the process of manufacturing the transparent stretchable structure of the present invention will be given below with reference to FIG. 5.

FIG. 5 is an exemplary flowchart illustrating a method of manufacturing a transparent stretchable structure related to an embodiment of the present invention. According to an embodiment, the method of manufacturing a transparent stretchable structure may include the following operations. The order of the operations illustrated in FIG. 5 may be changed as necessary, and at least one operation may be omitted or added. That is, the above-described operations are only embodiments of the present invention, and the scope of the present invention is not limited thereto.

According to an embodiment of the present invention, the method of manufacturing a transparent stretchable structure may include providing a stretchable film (S100).

In an embodiment, a stretchable film 10 may include a block copolymer-based thermoplastic elastomer. The block copolymer may be a polymer formed by linearly connecting two or more different polymer monomers.

According to the embodiment, the stretchable film may be formed by coating with a mixed solution of a block copolymer and an organic solvent. Here, the coating may include spin coating, spray coating, dip coating, slit die coating, bar coating, or the like.

In the embodiment, through coating, a block copolymer layer may be probably formed to have a thickness of 1 μm to 10 mm, and more probably, a thickness of 10 μm to 5 mm. Further, as the organic solvent, one or more materials selected from among cyclohexane, tetrahydrofuran, chloroform, acetone, and toluene may be used.

According to an embodiment, the stretchable film 10 may include cylindrical nanostructures, lamellar nanostructures, or crystalline nanostructures. In a specific embodiment, the stretchable film 10 may be a cylindrical block copolymer or a lamellar block copolymer.

In a block copolymer thin film, various nanostructures having a size of several tens of nanometers may be formed through a microphase separation process. Such a block copolymer self-assembly may be mainly formed in a cylindrical shape or a lamellar shape depending on a relative ratio of the polymers forming each block.

In an embodiment, the nanostructures may have a size of 5 nm to 100 nm. Since the nanostructures have a size of 5 nm to 100 nm, a certain level of transparency may be secured when the transparent stretchable structure 100 is formed using the corresponding stretchable film 10. For a specific example, when the nanostructures are formed with a size of 100 nm or more or reinforcing materials having a size of 100 nm or more are impregnated into a structure in order to realize a Poisson's ratio close to zero, a difference in deformation may be clearly identified with the naked eye during stretching or light scattering characteristics (haze) may be increased, and thus there is a risk of degrading transparency. Due to the degradation in transparency, it may be difficult to utilize the transparent stretchable structure as a stretchable transparent display.

In the present invention, through the nanostructures oriented in one direction, the transparent stretchable structure 100 may have a Poisson's ratio close to zero. In this case, the nanostructures oriented in one direction have a size of 5 nm to 100 nm and are implemented to have a size smaller than a wavelength of visible light, and thus do not affect transparency. That is, the orientation of nanocylinders has a significantly smaller domain size than the wavelength of visible light so that distortion caused by refraction and scattering does not occur, and thus transparency may be maintained even during stretching.

According to an embodiment, when nanostructures of the block copolymer are cylindrical nanostructures, the nanostructures in which cylinders lie should be horizontally oriented in order to align the nanostructures of the block copolymer in one direction, and when the nanostructures of the block copolymer are layered lamellar nanostructures, the nanostructures should be vertically oriented.

Generally, in block copolymers, since polymers with two different types of properties are bound together by a covalent bond, the surface and interfacial energies between two domains are different so that a specific domain tends to be located on the surface or interface, and as a result, most block copolymer thin films have horizontally oriented nanostructures.

Therefore, in the case of a cylindrical block copolymer having a horizontally oriented structure, no additional process is required for the surface and interface, whereas in the case of a layered lamellar block copolymer, an additional neutralization process may be required on both the surface of the film and the interface with the substrate.

According to an embodiment, when the stretchable film 10 is a lamellar block copolymer, a vertical orientation process corresponding to a process for the lamellar block copolymer may be additionally performed.

In a specific embodiment, a process of forming a random copolymer having neutral interfacial energy on a contact surface of the lamellar block copolymer and forming a cross-linked layer by subjecting a surface of the corresponding copolymer to a plasma process to which a filter is applied may be performed. Here, the filter may serve to block ultraviolet (UV) light generated by the plasma. In the embodiment, the filter may be provided through various materials capable of blocking UV light. In various embodiments, when the filter is formed as a single layer, it may not be able to block UV light due to diffraction and interference, and thus the filter is preferably formed as multiple layers, more than a double layer, and most preferably as a double layer.

The filter formed as a double layer is a double-layered filter including a first layer and a second layer, the first layer and the second layer are in parallel, and the filter may include a slit that is an open part of the first layer and a line that is a closed part of the second layer.

In the embodiment, the filter may be made of a metal material and may be coated with an insulator to limit contact with the ground. For example, the filter may be coated with polyimide resin. The filter may have a light transmittance of 10% or less for a wavelength of 250 to 550 nm. When the light transmittance of the wavelength range of the filter exceeds 10%, a thickness of the formed cross-linked layer may be rapidly increased. In this case, since the chemical composition of the block copolymer is changed, the cross-linked layer having a neutral affinity cannot be formed in each of blocks constituting the block copolymer, and thus sufficient vertically oriented nanostructures that are meaningful from an industrial point of view cannot be formed.

In the embodiment, the cross-linked layer may be formed to have a thickness of 1 to 10 nm. The cross-linked layer may be formed by a crosslinking reaction caused by various materials generated by plasma. In the case of UV light generated by plasma, the UV light passes through the block copolymer of a thickness of several hundred nanometers or more to cause chemical modification, whereas, in the present invention, since UV light is blocked using the filter, a cross-linked layer having a thickness of several nanometers may be formed. When the thickness of the cross-linked layer is less than 1 nm, the cross-linked layer collapses during annealing, and thus there is a concern that the cross-linked layer may not function as a neutral layer, and when the thickness of the cross-linked layer exceeds 1 nm, problems, such as wrinkles being generated on a surface of the cross-linked layer after annealing and the like may occur, which is not preferable.

In the embodiment, the filter may simultaneously block UV light and ions generated by plasma. When ion bombardment occurs in which ions generated by plasma reach a block copolymer layer, a density of a formed cross-linked layer is significantly increased, which may cause a problem that etching of the cross-linked layer for self-assembly pattern manufacturing cannot be performed smoothly in the future. Accordingly, the filter may be provided to simultaneously block the UV light and ions generated by the plasma. In a plasma process, inert gas plasma or air plasma may be used. The inert gas may include argon, nitrogen, or the like. When oxygen is included in the plasma process, etching occurs on a surface of the block copolymer, and thus inert gas plasma may be preferably used.

In an embodiment, the stretchable film 10 may include at least one of a block copolymer related to styrene-isobutylene-styrene (SIBS), styrene-butadiene-styrene (SBS), styrene-isoprene-styrene (SIS), styrene-ethylene-butylene-styrene (SEBS), styrene-ethylene-propylene-styrene (SEPS), or styrene-ethylene-ethylene-propylene-styrene (SEEPS), theromoplastic polyurethane (TPU), and a liquid crystal elastomer (LCE). Preferably, the stretchable film 10 may be formed of styrene-isobutylene-styrene (SIBS). When the stretchable film 10 is formed to include styrene-isobutylene-styrene (SIBS), transparency above a certain level may be secured and the stretchable film 10 may have improved gas blocking properties and liquid blocking properties.

According to the embodiment, the stretchable film 10 may have a thickness of 10 μm to 5 mm. Since the stretchable film 10 of the present invention includes a block copolymer having a certain thickness, a rolling process may be performed in a state of not including a separate substrate.

For example, in the case of performing a rolling process on a block copolymer with a small thickness (thin film of 1 μm or less), a substrate such as a silicon wafer or the like should be essentially provided, and the rolling process may be performed after placing a film related to the block copolymer on the corresponding substrate. Further, for example, when a rolling process is performed on a block copolymer with a small thickness, a buffer layer that performs a separate buffering action should be provided to protect a block copolymer film with a small thickness from being damaged.

Since the stretchable film 10 of the present invention has a set thickness (10 μm to 5 mm), the rolling process may be performed on the film in a free-standing state without a separate substrate.

As illustrated in FIG. 4, in a state in which the stretchable film 10 is positioned on a stage 300 of the rolling machine, when the rolling machine operates, shear may be applied to the corresponding stretchable film 10. In the embodiment, the shear may be applied to the stretchable film 10 through an asymmetric rolling process in which a moving speed of the stage 300 and a moving speed of an upper roll 200 are different.

According to an embodiment of the present invention, a method of manufacturing a transparent stretchable structure may include performing a rolling process on a stretchable film to form a transparent stretchable structure (S200).

That is, as illustrated in FIG. 4, the random fingerprint-shaped nanostructures formed on the stretchable film 10 may be deformed into cylinder-shaped nanostructures oriented in one direction by applying shear through rolling, and thus the transparent stretchable structure 100 may be formed.

In an embodiment, the rolling process may be a processing method of forming a plate material by passing a metal material between two rotating rolls and reducing a cross-sectional thickness by the pressure of the rolls.

According to an embodiment, the rolling process performed in the present invention may be an asymmetric rolling process in which a speed of an upper roll and a speed of a lower roll are different. An asymmetric rolling process in which speeds of two rolls are different, that is, a shear rolling process that can apply shear to a metal material, has an advantage of being able to orient metal structures or crystals in one direction much more than general rolling.

Preferably, the asymmetric rolling process is performed using a rolling machine including an upper roll, a lower roll, and a stage positioned on the lower roll.

In the embodiment, the asymmetric rolling process may be performed by setting a difference between a moving speed of the upper roll and a moving speed of the stage to 0.1 to 100 mm/s, and the difference preferably ranges from 0.3 to 50 mm/s, more preferably 0.5 to 10 mm/s, furthermore preferably 1 to 5 mm/s, and most preferably 1.5 to 3 mm/s. When the difference between the moving speeds is less than 0.1 mm/s or greater than 100 mm/s, unidirectional orientation may not be performed properly.

The moving speeds of the upper roll and the stage may be adjusted within a range of 1 to 100 mm/s, preferably in a range of 5 to 50 mm/s, and more preferably in a range of 8 to 20 mm/s. When the moving speeds are less than 5 mm/s, a process time of the unidirectional orientation may be increased, and when the moving speeds are higher than 50 mm/s, defects may occur in the unidirectional orientation.

When the asymmetric rolling process is performed, the moving speed of the upper roll may be smaller than the moving speed of the stage. When the moving speed of the stage is high, a moving direction of the substrate and a direction of shear are opposite so that the degree of orientation may be slightly lower than when the moving speed of the roller is high, and thus it is preferable that the moving speed of the roll be greater than the moving speed of the stage.

FIG. 6 is a set of exemplary diagrams showing pattern aspects of nanostructures according to a difference in speed between an upper roll and a substrate during an asymmetric rolling process related to an embodiment of the present invention. The drawings shown in FIG. 6 are scanning electron microscope (SEM) images obtained after an oxygen plasma process is performed to confirm the morphology of nanostructures of a block copolymer.

In a specific embodiment, Poly(2-vinylpyridine)-block-polystyrene-block-poly(2-vinylpyridine) (P2VP-b-PS-b-P2VP), which is a lamellar block copolymer with a molecular weight of 12 kg/mol-23 kg/mol-12 kg/mol, was dissolved in a chloroform solvent at a concentration of 8 mg/ml to prepare a P2VP-b-PS-b-P2VP block copolymer solution, and a random copolymer coating layer of a prepared silicon wafer substrate was subjected to spin coating with the P2VP-b-PS-b-P2VP block copolymer solution at 6,000 rpm for 30 seconds to form a film with a thickness of 1 mm.

Thereafter, a filter was mounted on a surface of the P2VP-b-PS-b-P2VP block copolymer film layer to form vertically oriented nanostructures of the block copolymer film layer through an Ar plasma process blocking UV light [0098]. Here, the Ar plasma process was performed using reactive ion etching equipment (Plasma Pro 800 RIE, Oxford Inc.) under conditions of an Ar flow rate of 50 sccm and 15 mTorr, the sizes of a slit and a line of the filter used were respectively 800 and 1,200 μm, a gap between double layers was 200 μm, and a distance from a sample was 3,000 μm.

As described above, the prepared and vertically oriented lamellar P2VP-b-PS-b-P2VP block copolymer film was placed on the stage, and then the stage was adjusted at a temperature of 260° C., and the asymmetric rolling process was performed one time to perform shearing. That is, a shear rolling process in which shear was applied to the film was performed by adjusting the speeds of the roller and the stage differently.

Here, FIG. 6A is an SEM image obtained by adjusting the moving speeds of the upper roll and the stage to be the same, FIG. 6B is an SEM image obtained by adjusting the moving speeds of the upper roll and the stage to 10 mm/s and 8 mm/s, respectively, and FIG. 6C is an SEM image obtained by adjusting the moving speeds of the upper roll and the stage to 10 mm/s and 5 mm/s, respectively.

Referring to FIG. 6A, it can be seen that when the speed of the stage and the speed of the upper roll are the same, effective shear deformation does not occur in the stretchable film made of the block copolymer. That is, it can be seen that the lamellar structure standing vertically without orientation in a specific direction is formed in the form of a random fingerprint. On the other hand, referring to FIG. 6B, it can be seen that when a film is formed by adjusting the speeds of the upper roll and the stage at a ratio of 10:8, shear deformation is properly performed and horizontal orientation in one direction is well performed. Further referring to FIG. 6C, it was confirmed that when a film is formed by adjusting the speeds of the upper roll and the stage at a ratio of 10:5, a difference between the speeds of the stage and the upper roll becomes too large, and thus the block copolymer film slides off the stage so that the block copolymer was not subjected to proper shear deformation and the film was damaged. Therefore, it can be seen that a ratio between the speeds of the upper roll and the substrate should be maintained within an appropriate range in order to implement horizontal orientation in one direction.

As described above, when the asymmetric rolling process in which the speeds of the stage and the upper roll are different is performed, strong shears are sequentially applied to the block copolymer film (i.e., stretchable film) like big waves, and thus unidirectional and horizontal orientation may be performed at an ultra-high speed within one minute even on a large area at the level of a 4-inch wafer. This may provide an effect of improving the mass productivity of a transparent stretchable structure by inducing a large-area manufacturing process and an increase in manufacturing speed.

Further, the asymmetric rolling process may be performed together with heat treatment that utilizes a plate-shaped stage. The stage may be provided to allow a temperature thereof to be adjusted, and may be positioned between rolls to supply heat to a stretchable film when a rolling process is performed on the corresponding film.

In the embodiment, the temperature of the heat treatment may range from 150 to 280° C. In the present invention, since the stretchable film 10 to be subjected to a rolling process has a certain thickness or more (e.g., 10 μm to 5 mm), the rolling process may be performed by adjusting the temperature of the stage to a temperature of 150 to 280° C.

Further, according to the embodiment, as the rolling process in the present invention, one-time rolling may be performed rather than repeated rolling. For example, when the thickness of the stretchable film 10 is less than a certain level (e.g., 1 μm or less), it is difficult to adjust the temperature of the stage to a certain level or higher (e.g., 200)° ° C. during the rolling process, and thus repeated rolling should be performed a plurality of times.

In the case of the present invention, since the stretchable film 10 having a certain thickness or more is used, the rolling process may be performed at a high temperature, and accordingly, the degree of unidirectional orientation of nanostructures may be maximized even with one-time rolling. Accordingly, the manufacturing process time may be reduced, and thus efficiency of the process can be improved.

In various embodiments, the providing of the stretchable film 10 may include introducing a curing agent into the stretchable film 10. In a specific embodiment, the curing agent may be added to the mixed solution of a block copolymer and an organic solvent. When the stretchable film 10 includes the curing agent, there is an advantage in that the durability of nanostructure patterns oriented in one direction is improved. For example, in the case of the transparent stretchable structure 100 formed through shear rolling, the nanostructure patterns oriented in one direction may be released at a high temperature. For example, the nanostructure patterns oriented in one direction may return to nanostructure patterns in the form of random fingerprint patterns at a high temperature. Accordingly, in the present invention, the curing agent may be introduced into the stretchable film 10 in the providing of the stretchable film 10. In the embodiment, after a shear rolling process is performed on the stretchable film 10, curing treatment may be additionally performed using UV light. In the embodiment, curing treatment may also be performed during rolling. For example, a UV light source may be positioned at a rear end of a roller to supply UV light to the transparent stretchable structure 100 subjected to the rolling process. Accordingly, the holding power or durability of the nanostructured patterns oriented in one direction may be improved even at a high temperature.

FIGS. 7 to 10 are exemplary diagrams showing performance values related to the transparent stretchable structure manufactured through the method for manufacturing the transparent stretchable structure of the present invention.

In a specific embodiment, a rolling process was performed on styrene-isobutylene-styrene (SIBS) having a thickness of 1 mm. Specifically, a transparent stretchable structure 100 was formed by adjusting the stage to a temperature of 260° C. and applying shear thereto by performing an asymmetric rolling process one time. In the case of the asymmetric rolling process, the speeds of the upper roll and the stage were adjusted to have a ratio of 10:8. For the transparent stretchable structure formed through the rolling process, a modulus in a first direction in which the nanostructures were horizontally oriented and a modulus in a second direction perpendicular to the first direction were measured. Further, for experiments, a comparison group was provided with a transparent stretchable structure to which shear was applied through a separate rolling process and a film in a state in which shear was not applied (i.e., having random fingerprint-shaped nanostructure patterns), and a Poisson's ratio between the transparent stretchable structure subjected to the rolling process and the film not subjected to the rolling process was measured. Additionally, experiments related to the transparency and gas blocking properties of the transparent stretchable structure having the nanostructures oriented in one direction were performed.

According to the embodiment, the transparent stretchable structure 100 may have an anisotropy in which the modulus in the first direction related to the orientation direction of the nanostructures is at least 20 times greater than the modulus in the second direction perpendicular to the first direction.

In a detailed embodiment, referring to FIG. 7, it can be seen that a modulus of the nanostructures in a horizontal direction (EH) of the orientation is 55 MPa, which is 20 times or more (about 27 times) the modulus of 2 MPa corresponding to a vertical direction (Ep) of the orientation.

Further, referring to FIG. 8, it can be seen that since no rolling process is performed, a transparent stretchable structure (without shear) (or stretchable film) having random fingerprint-shaped nanostructure patterns has a Poisson's ratio of approximately 0.4. For example, as the Poisson's ratio approaches zero, the strain in a direction perpendicular to the stretching direction may be minimized. For example, in the case in which the Poisson's ratio is zero, even when the film is stretched in a specific direction, shrinkage may not occur in the direction perpendicular to the corresponding stretching direction.

On the other hand, it can be seen that the transparent stretchable structure (with shear) having the nanostructures oriented in one direction through a rolling process has a Poisson's ratio of 0.1 or less. The transparent stretchable structure 100 of the present invention may have a Poisson's ratio of 0.1 or less. That is, it can be seen that the transparent stretchable structure having the nanostructures oriented in one direction by performing the rolling process has a significantly lower Poisson's ratio than that of the structure without the nanostructures oriented in one direction.

That is, the transparent stretchable structure 100 of the present invention may satisfy a condition of an anisotropy in which a complex modulus (i.e., modulus in the first direction) in the orientation direction is at least 20 times greater than the modulus (i.e., modulus in the second direction) in the direction perpendicular to the orientation direction. In this case, when the transparent stretchable structure 100 is stretched in the direction perpendicular to the orientation direction, a force for vertical compression is applied in the orientation direction with a modulus of 20 times or more, and thus contraction strain may be reduced by 20 times or less.

In the transparent stretchable structure 100 of the present invention, a modulus in the orientation direction and a modulus in the direction perpendicular to the orientation direction may be different from each other (i.e., the modulus related to the orientation direction is 20 times the modulus related to the direction perpendicular to the orientation direction) due to a structure in which the nanostructures are oriented in one direction. The transparent stretchable structure 100 may have mechanical anisotropy with respect to a stretching direction and a direction perpendicular to the stretching force. Since the transparent stretchable structure 100 having mechanical anisotropy has different mechanical properties depending on the direction, a Poisson's ratio close to zero may be realized.

Additionally, the transparent stretchable structure 100 of the present invention may be formed through nanostructures having a size of 5 nm to 100 nm smaller than a wavelength of visible light, and thus transparency may not be significantly degraded. That is, the transparent stretchable structure 100 of the present invention may have a Poisson's ratio close to zero and at the same time, have a certain level of transparency.

In the embodiment, referring to FIG. 9, it can be seen that, when the transparent stretchable structure 100 is formed by applying shear to SIBS through rolling, the transparent stretchable structure 100 has excellent blocking properties against moisture. The stretchable structure 100 of the present invention has a blocking property of about 1.2 gm/m$^2$. For example, when a substrate is formed using the stretchable structure 100, a display capable of controlling strain in a direction perpendicular to a stretching direction through a Poisson's ratio close to zero, that is, a flexible display, may be provided. In this case, since the stretchable structure 100 has excellent blocking properties, it is possible to provide solid blocking properties even during stretching, and thus improve the stability of a device formed through the stretchable structure 100.

FIG. 10 is a set of exemplary diagrams for explaining that it is possible to control the normal strain of a transparent stretchable structure during stretching related to an embodiment of the present invention. FIG. 10A is a diagram related to a transparent stretchable structure 100 before the transparent stretchable structure 100 is stretched, FIG. 10B is a diagram related to a case in which a film in which nanostructures are not oriented in one direction is stretched because the shearing process is not performed, and FIG. 10C is a diagram related to a case in which the transparent stretchable structure 100 including nanostructures oriented in one direction is stretched because the shearing process is performed. Referring to FIG. 10B, when the film having fingerprint patterns in which nanostructures are randomly formed is stretched in a first direction (e.g., an x-axis direction based on the drawing), shrinkage may be caused in a second direction (e.g., a y-axis direction based on the drawing). On the other hand, in the case of the transparent stretchable structure 100 of the present invention, it can be seen that even when stretched in the first direction as illustrated in FIG. 10C, deformation in the second direction is minimized. That is, in the case of the transparent stretchable structure 100 of the present invention, it can be seen that normal strain is controlled during stretching.

In summary, in the case of the method of manufacturing a transparent stretchable film of the present invention, since the transparent stretchable structure may be formed by performing a shear rolling process on the stretchable film 10, it is possible to provide an effect of improving the mass productivity of the stretchable structure by improving convenience and inducing a large area.

In particular, since the stretchable film 10 has a certain level or more of thickness (10 μm to 5 mm), a substrate for supporting the stretchable film or a separate buffer layer for protecting the film from being damaged may not be provided during rolling. That is, the stretchable film may be subjected to a rolling process in the form of a single film, and thus convenience in the process can be improved.

Further, since the stretchable film 10 is provided to have a certain level or more of thickness (10 μm to 5 mm), a high-temperature shear rolling process may be performed thereon, and thus the stretchable film 10 may have nanostructures oriented in one direction through only one-time rolling rather than repeated rolling. That is, the degree of unidirectional orientation of nanostructures may be maximized even with one-time rolling, and accordingly, the manufacturing process time may be shortened and thus process efficiency can be improved.

Further, the transparent stretchable structure 100 formed through the high-temperature shear rolling process may have a Poisson's ratio close to zero due to anisotropy through the nanostructures oriented in one direction. Here, since the nanostructures oriented in one direction included in the transparent stretchable structure 100 have a significantly smaller domain size (i.e., 5 nm to 100 nm) than the wavelength band of visible light, distortion caused by refraction and scattering does not occur, and thus transparency may be maintained even during stretching. Additionally, improved gas blocking properties may be obtained through the nanostructured patterns oriented in one direction. Since the gas blocking properties are improved, utilization of the transparent stretchable structure 100 may be increased, and the stability of electronic products manufactured through the transparent stretchable structure 100 can be improved.

According to various embodiments of the present invention, a transparent stretchable structure that can be deformed in a multidimensional axial direction under various conditions and freely used can be provided. Further, a stretchable structure having stable mechanical strain and high transmittance can be provided. Additionally, it is possible to improve the mass productivity of the stretchable structure by inducing an increase in manufacturing speed and a large area through optimization of the manufacturing process.

Effects of the present invention are not limited to the above-described effects and other effects that are not described may be clearly understood by those skilled in the art from the above detailed description.

While embodiments of the present invention have been described with reference to the accompanying drawings, the above description of the present invention is only exemplary, and it will be understood by those skilled in the art that various modifications can be made without departing from the scope of the present invention and without changing essential features. Therefore, the above-described embodiments should be considered in a descriptive sense only and not for purposes of limitation.

The particular implementations shown and described herein are illustrative examples of embodiments and are not intended to otherwise limit the scope of embodiments in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in an actual device. Moreover, no item or component is essential to the practice of embodiments unless the element is specifically described as "essential" or "critical."

It will be appreciated that a specific order or hierarchy of operations in the processes presented is an example of exemplary approaches. Based on design priorities, it will be appreciated that the specific order or hierarchy of operations in the processes may be rearranged while remaining within the scope of the present invention. The accompanying method claims present elements of various operations in a sample order, but are not meant to be limited to the specific order or hierarchy presented.

The description of the above-described embodiments is provided to enable those skilled in the art to use or carry out the present invention. Various modifications of the embodiments will be apparent to those skilled in the art and the generic principles defined herein may be applied to other embodiments without departing from the scope of the present invention. Therefore, the present invention is not limited to the above-described embodiments and will be construed in the broadest scope consistent with the principles and new features described above.

What is claimed is:

1. A transparent stretchable structure comprising nanostructures which are oriented in one direction as a rolling process is performed on a stretchable film provided through a thermoplastic elastomer based on physical crosslinking, wherein the stretchable film includes a block copolymer, wherein the nanostructures are microphase-separated domains of the block copolymer formed by self-assembly, and the nanostructures oriented in one direction have a size of 5 nm to 100 nm.

2. The transparent stretchable structure of claim 1, wherein the stretchable film has a thickness of 10 μm to 5 mm.

3. The transparent stretchable structure of claim 1, wherein the rolling process is an asymmetric rolling process, in which a speed of an upper roll and a speed of a lower roll are different, and is performed together with heat treatment.

4. The transparent stretchable structure of claim 3, wherein a temperature of the heat treatment ranges from 150 to 280° C.

5. The transparent stretchable structure of claim 1, a curing agent is introduced into the stretchable film, and the rolling process is performed together with curing treatment.

6. The transparent stretchable structure of claim 1, wherein the block copolymer includes at least one of styrene-isobutylene-styrene (SIBS), styrene-butadiene-styrene (SBS), styrene-isoprene-styrene (SIS), styrene-ethylene-butylene-styrene (SEBS), styrene-ethylene-propylene-styrene (SEPS), or styrene-ethylene-ethylene-propylene-styrene (SEEPS).

7. The transparent stretchable structure of claim 1, wherein the stretchable film includes nanostructures in a form of cylinders, lamellas, or crystals.

8. The transparent stretchable structure of claim 1, wherein the transparent stretchable structure has an anisotropy in which a modulus in a first direction related to an orientation direction of the nanostructures is at least 20 times greater than a modulus in a second direction perpendicular to the first direction, and a Poisson's ratio of the transparent stretchable structure is 0.1 or less.

* * * * *